No. 645,178. Patented Mar. 13, 1900.
C. W. MILES.
PROCESS OF REDUCING EASILY OXIDIZABLE METALS.
(Application filed Dec. 28, 1898.)
(No Model.) 2 Sheets—Sheet 2.
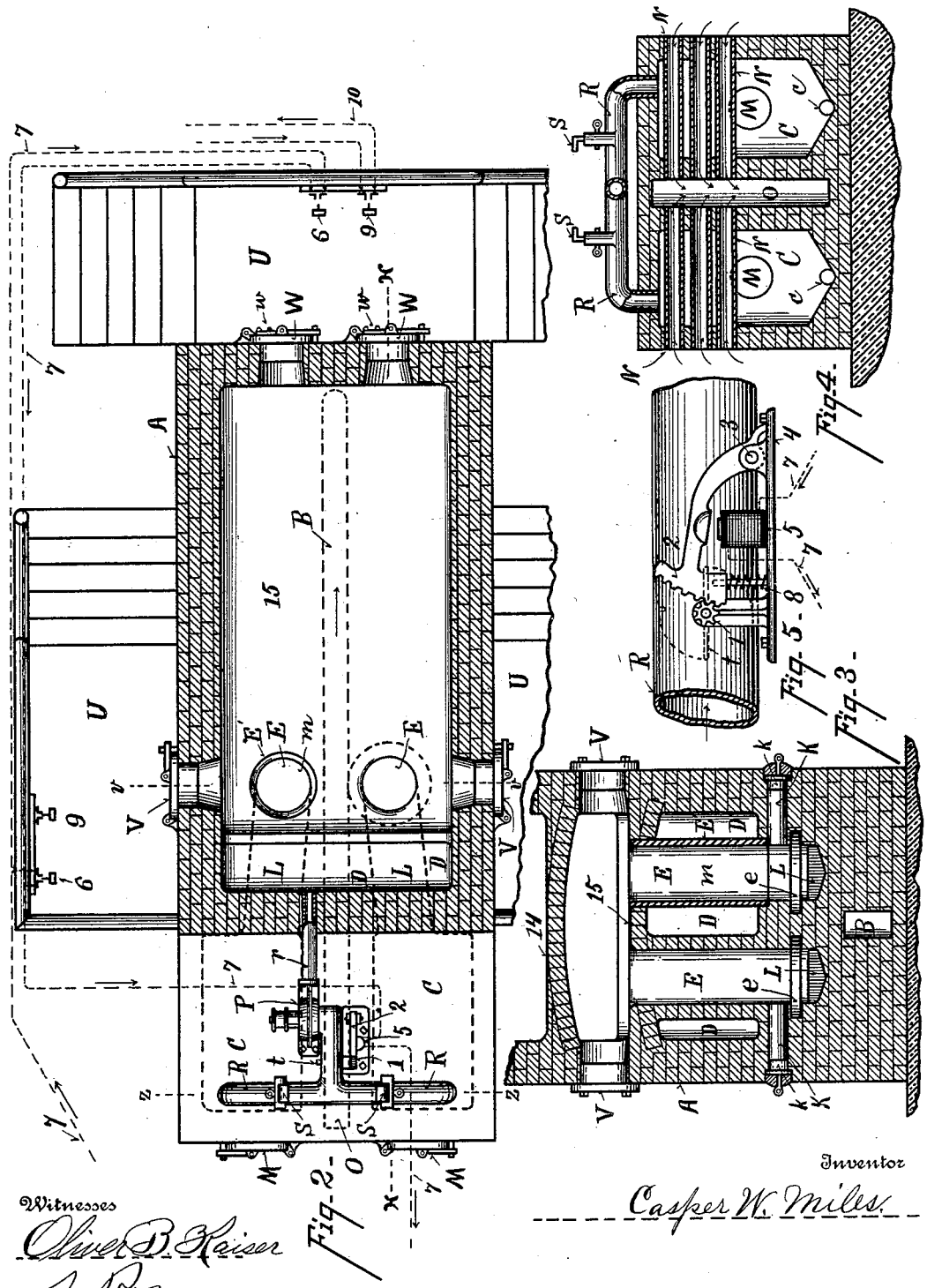
Witnesses
Oliver B. Keiser
A. Ros.
Inventor
Casper W. Miles.

No. 645,178. Patented Mar. 13, 1900.
C. W. MILES.
PROCESS OF REDUCING EASILY OXIDIZABLE METALS.
(Application filed Dec. 28, 1898.)
(No Model.) 2 Sheets—Sheet 1.
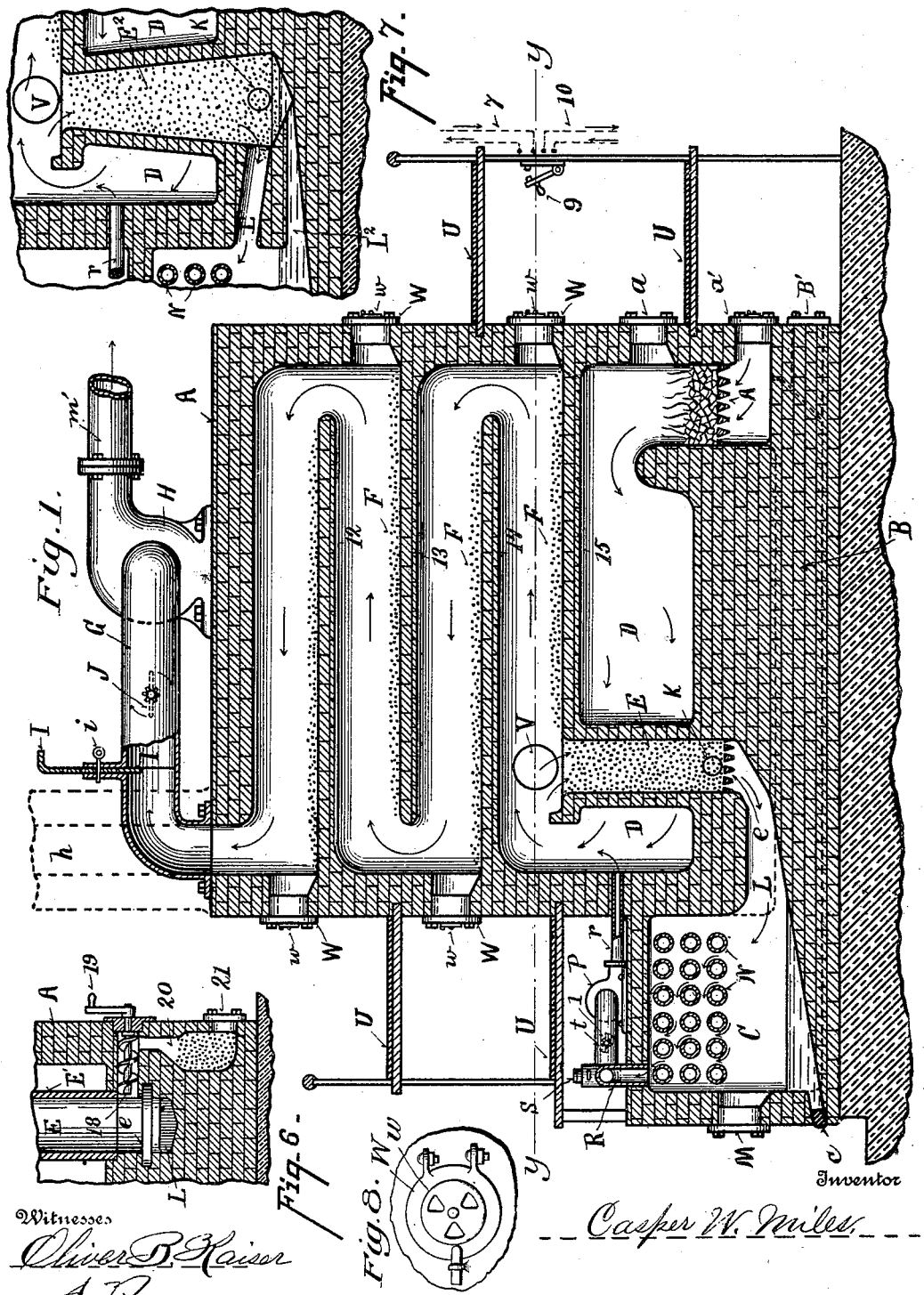

UNITED STATES PATENT OFFICE.

CASPER W. MILES, OF CINCINNATI, OHIO.

PROCESS OF REDUCING EASILY-OXIDIZABLE METALS.

SPECIFICATION forming part of Letters Patent No. 645,178, dated March 13, 1900.

Application filed December 28, 1898. Serial No. 700,493. (No specimens.)

*To all whom it may concern:*

Be it known that I, CASPER W. MILES, a citizen of the United States, residing at Cincinnati, in the county of Hamilton and State of Ohio, have invented certain new and useful Improvements in Processes of Reducing Easily-Oxidizable Metals, of which the following is a specification.

My invention relates to a process for the reduction of easily-oxidizable metals, such as zinc.

In the drawings forming part of this specification I have illustrated some forms of apparatus with which my process may be carried out.

Figure 1 is a vertical section through my apparatus on line $x$ $x$, Fig. 2. Fig. 2 is a horizontal section through the same on line $y$ $y$, Fig. 1. Fig. 3 is a vertical section through the same on line $v$ $v$, Fig. 2. Fig. 4 is a vertical section through the same on line $z$ $z$, Fig. 2. Fig. 5 is a detail view of one form of mechanism for shutting off the draft in either the reduction or roasting compartment. Fig. 6 is a similar view to Fig. 3, showing a modification of the means for removing the spent charge from the reducing-chamber. Fig. 7 shows a modification of the reducing-furnace shown in Fig. 1. Fig. 8 is a detail plan view of one of the dampers.

A represents the furnace, built of fire-brick. A' represents a grate upon which is supported a body of coke or similar fuel to furnish the heat necessary for the reduction and roasting operations. The fuel is supplied through doors $a$ or by a mechanical stoker, if desired, and the ashes removed through doors $a'$. The air to support combustion may be supplied through doors $a'$, but is preferably supplied in a heated state through a flue or passage B from the condenser C. From the fire-bed the products of combustion pass through the heating-compartment D and envelop the reduction-chambers E, of which one or more may be employed, as desired. From the compartment D the bulk of the products pass successively over the beds of ore F on the shelves or arches 12 13 14 15 to roast the ore and reduce it to an oxid before its introduction into the reducing-chamber.

H represents a fan or blower which draws the air through the fire and through the roasting-compartment and discharges the resultant products through pipe $m'$ to a sulfuric-acid chamber or into the open air. Where the products are to be wasted, a chimney $h$ (shown in dotted line) may be substituted, if desired.

I represents a valve or diaphragm in the pipe G, which may be adjusted by means of a pin $i$ and a series of holes in the diaphragm to reduce the pipe area to a greater or less extent, and thereby control the draft or rapidity of circulation through the furnace.

J represents a pivoted valve which may be thrown by any suitable mechanism to temporarily shut off or stop the circulation through the roasting-compartment.

The reduction-chamber E may be in the form of a square or circular tube extending up from the bed of the furnace, with an open mouth into which the previously-roasted ore and the requisite amount of coke or similar reducing agent may be fed.

$e$ represents a grate upon which the charge rests, and K a passage through which the spent portion of the charge can be removed from time to time. Below the grate $e$ is a passage L, leading to a condenser-chamber C, in which the vapor of the metal is condensed to a liquid and drawn off through the port $c$.

M represents a door through which entrance may be obtained to clean the condensing-chamber and make repairs.

N represents a series of tubes, of porcelain or other suitable material, projecting from one wall of the condenser-chamber to the other and through which air is circulated to condense the metal. The air after passing through these condenser-tubes and being heated enters chamber O, and thence through flue B is conducted to the ash-pit beneath the grate A'.

P represents a fan or blower connected by pipe R with the condenser-chamber and discharging the collected gases through pipe $r$ back into the heating-chamber. This pipe R is provided with valve or diaphragm S, similar to valve I, to regulate the amount of gas supplied to the fan and also with a pivoted valve $t$, similar to valve J, by means of which the circulation through the reducing and condensing chambers may be temporarily shut off. I have shown two separate reducing-chambers located in the heating-compartment D and two separate condensing-chambers separated by the air-chamber O, the pipes R of the separate condenser-chambers leading to a common blower or fan. It is obvious that either one or both of these reducing-chambers may be operated at one time, and in case only one is in use the tubes N of the opposite condenser should be covered, so as to prevent any extensive passage of air through them.

V represents doors through which carbon can be introduced and mixed with the roasted ore in the reducing-chamber.

It is often necessary or at least best to temporarily shut off the circulation through the reducing and condensing chambers or through the roasting-compartment, or both, in order to remove the spent charge from the reducing chamber or to feed fuel, ore, or carbon, and in order to readily accomplish this I provide the pivoted valves J t, located, respectively, in the circulating-pipes, with means located near the several feeding and discharge doors for throwing said valves or either of them. In Fig. 5 I have shown one form of mechanism adapted to accomplish this purpose. 1 represents a gear-wheel located on the stem of the pivoted valve. 2 represents a segment provided with teeth meshing with said gear and pivoted at 3 to the bed-plate 4. 5 represents an electromagnet energized by closing any one of the switches 6 to make circuit through the line-wires 7 and said magnet to draw down the segment 2 against the action of spring 8 and close the valve t. The switches 9 are connected through line-wire 10 with a similar mechanism for closing the valve J. I do not attach any importance to the particular form of mechanism employed to close these valves J and t, as various forms of mechanism can be satisfactorily employed for this purpose.

U represents platforms beneath the several doors to enable the operator to feed and attend to the furnace.

The mode of operation is as follows: A fire is started on the grate A' and the fan H started. Ore is fed upon the several shelves 12 13 14 15 and thoroughly roasted, after which the lower portions of the chambers E are filled with crushed coke and the passage E closed and carefully luted. The door M and port c are also carefully luted, so as to prevent the introduction of any air through these openings. The ore on shelf 15 is then mixed with crushed coke and fed into the chambers E, or alternate thin layers of ore and coke may be fed into said chambers until they are nearly full. The fan P is then started and the draft regulated by valves S to feed or draw a portion of the products of combustion slowly down through the bed of ore and coke and through the condenser-chamber and back to the main furnace-flue, whereby the oxygen still contained in that portion of the products of combustion which is drawn into the chamber E is combined with carbon, and thereby assists in further raising the temperature of the charge until the oxygen is wholly exhausted and the metallic oxid finally reacts with the carbon, freeing the metal, which is conducted to the condensing-chamber and deposited, while the waste gases, together with the carbon monoxid formed in reducing the metal, are returned to the main flue, where the carbon monoxid is burned and its heat utilized. When the roasted ore upon shelf 15 is exhausted, the roasted ore from shelf 14 is pushed off or fed over the end of the shelf by the operator and falls upon shelf 15, where it is spread out and further roasted until required in the reducing-chambers. The ore on the shelves 12 13 is then in like manner successively fed to the next lower shelf and spread evenly thereon, when a charge of fresh ore is placed on shelf 12, by which arrangement the ore is heated from beneath as well as above and the ore is successively exposed by steps to a higher degree of heat until the roasting process is complete, when it is introduced without loss of heat into the reducing-chamber. The spent portion of the charge is removed from the lower portion of the reduction-chamber from time to time in the following manner: The valve t is first shut, after which the door or cap k is withdrawn and a tool introduced to withdraw the lower portion of the charge, after which the door k is again closed and luted and the valve t opened. A small quantity of ash, &c., will work into the condensing-chamber, which is removed when necessary through door M.

In the modification Fig. 6 I have shown a spiral conveyer 18 journaled in the passage K and provided with a crank 19, by means of which the conveyer may be turned from time to time to remove the spent portion of the charge and deposit it in a pit or chamber 20 of considerable size, from which it may be removed through door 21 without closing the valve t or interrupting the process of reduction.

The reduction-chamber may be built up of brick, as shown in Fig. 1, or, as shown at m, Figs. 2 and 3, may be composed of a tube E', of fire-clay or other refractory material, which can be replaced from time to time when damaged. The reduction-chamber may also be made tapering, so that the upper portion is of smaller diameter than the bottom, to prevent the charge from choking therein. The grate in the lower portion of the reduction-chamber may also be dispensed with and the charge rest upon a fire-brick bottom, as shown in Fig. 7.

It will be noted that the processes of roasting and reducing might be carried on in separate apparatus with advantage over the previous practice in substantially the manner herein set forth, and I do not wish to limit myself to the combination of said processes except as specifically set forth in the claims.

By means of the foregoing apparatus I am enabled to reduce readily oxidizable metals by a continuous process with great economy of fuel and saving of labor.

W represents the doors opposite the several shelves, through which the feeding and roasting process is carried on, and $w$ represents dampers on said doors, which can be either closed or regulated to admit a small amount of air into the flue, if desired, to assist in the roasting process.

In the modification Fig. 7 the reduction-chamber $E^2$ tapers slightly, being larger at the bottom, so as to prevent the charge from choking, which it might do where a long reduction-chamber is employed. The grate $e$ is also omitted in this modification and two passages $L'$ and $L^2$ provided, leading into the condenser-chamber, one for the passage of the gases and the other to drain off the metal.

I have shown the reduction-chamber spanning the offtake-flue and being externally heated by the products of combustion, and such is the preferred form. It will be obvious, however, that the column of ore and carbon might be heated by other means.

While I have described very fully the operation of the particular apparatus shown for carrying out my process for the reduction of zinc, I do not wish to be limited to any particular form of apparatus, as it is obvious that various kinds of apparatus may be used to carry out this process and various metals reduced thereby. By my process it is possible to continuously reduce the metal, the maximum quantity of heat generated is utilized, and the cost of reduction reduced to a minimum.

I claim—

1. The process of reducing zinc ore which consists in supplying air to a body of fuel, passing the products of combustion around a mass of the ore and carbon, subdividing the current of said products of combustion, passing a portion thereof through said mass of ore and carbon, cooling the vapor so produced and thereby condensing the metallic fumes, mixing the uncondensed residual gas with the remaining portion of the current of the products of combustion, and conveying them in contact with the raw ore, substantially as described.

2. The process of reducing zinc ore which consists in supplying air to a body of fuel, passing the products of combustion around a mass of ore and carbon, subdividing the current of said products of combustion, passing a portion thereof through said mass of ore and carbon, cooling the vapor so produced, and thereby condensing the metallic vapor; substantially as described.

3. The process of reducing zinc ore which consists in supplying air to a body of fuel, heating a column of zinc ore and carbon by external means, then passing through said column of mixed ore and carbon a portion only of the products of combustion, cooling the vapor so produced and thereby condensing the metallic vapor, substantially as described.

In testimony whereof I have hereunto set my hand.

CASPER W. MILES.

Witnesses:
W. R. WOOD,
OLIVER B. KAISER.